United States Patent
Williams, Sr.

(10) Patent No.: US 10,078,870 B2
(45) Date of Patent: Sep. 18, 2018

(54) SYSTEM AND METHOD FOR AUTOMATED CONSOLIDATION OF INDIVIDUAL RETIREMENT ACCOUNTS

(75) Inventor: John Spencer Williams, Sr., Lyman, SC (US)

(73) Assignee: Retirement Clearinghouse, LLC, Charlotte, NC (US)

(*) Notice: Subject to any disclaimer, the term of this patent is extended or adjusted under 35 U.S.C. 154(b) by 129 days.

(21) Appl. No.: 13/543,239

(22) Filed: Jul. 6, 2012

(65) Prior Publication Data

US 2013/0185224 A1    Jul. 18, 2013

Related U.S. Application Data

(60) Provisional application No. 61/586,441, filed on Jan. 13, 2012.

(51) Int. Cl.
*G06Q 40/06* (2012.01)
*G06Q 40/02* (2012.01)

(52) U.S. Cl.
CPC ............ *G06Q 40/06* (2013.01); *G06Q 40/02* (2013.01)

(58) Field of Classification Search
CPC ..................................... G06Q 40/06
USPC ................................. 705/36 R, 36
See application file for complete search history.

(56) References Cited

U.S. PATENT DOCUMENTS

| | | | |
|---|---|---|---|
| 7,237,114 B1 * | 6/2007 | Rosenberg .......... | G06F 21/6209 705/67 |
| 7,870,046 B2 * | 1/2011 | Gupta ............... | 705/35 |
| 8,494,927 B2 * | 7/2013 | Blowers ............. | 705/30 |
| 2004/0098323 A1 * | 5/2004 | Bowser .............. | 705/35 |
| 2004/0254927 A1 * | 12/2004 | Lang et al. ......... | 707/5 |
| 2006/0080200 A1 * | 4/2006 | Ashton et al. ..... | 705/35 |
| 2006/0293984 A1 * | 12/2006 | Loch ................. | G06Q 40/00 705/35 |
| 2007/0011089 A1 * | 1/2007 | DeSchryver ........ | 705/39 |
| 2011/0270763 A1 * | 11/2011 | Graham et al. ..... | 705/71 |

* cited by examiner

*Primary Examiner* — Abhishek Vyas
*Assistant Examiner* — Murali K Dega
(74) *Attorney, Agent, or Firm* — Finnegan, Henderson, Farabow, Garrett & Dunner, LLP

(57) ABSTRACT

A computer implemented system/method carried out over one or more networks for consolidating retirement accounts owned by an owner, comprising: receiving an electronic data record from a first record keeper for a first retirement account owned by the owner; searching databases and/or sending search requests to one or more account record keepers including said first record keeper for one or more other retirement accounts owned by the owner; and consolidating the first retirement account into the one or more other retirement accounts upon finding the one or more other retirement accounts account.

4 Claims, 6 Drawing Sheets

SYSTEM AND METHOD FOR AUTOMATED CONSOLIDATION OF INDIVIDUAL RETIREMENT ACCOUNTS

CROSS REFERENCE TO RELATED APPLICATIONS

The present application claims benefit and priority from U.S. provisional application Ser. No. 61/586,441 entitled "AUTOMATIC ROLL-IN SYSTEM", filed Jan. 13, 2012, the disclosure of which is hereby incorporated by reference herein in its entirety for all purposes.

FIELD OF THE INVENTION

The present invention is directed to a system and method for automating the consolidation or roll-overs of individual retirement accounts.

BACKGROUND OF THE INVENTION

Many employers provide employee benefits, in the form of various benefits, plans and programs to their employees as part of their total compensation packages. These benefits may include employer administered or sponsored retirement plans, such as 401(k) plans, profit sharing programs and other similar plans.

The US retirement system today suffers from a significant lack of automation in the millions of largely manual, non-standardized transactions that occur in the transfer of consumer retirement accounts between former and current employer plans and between former employer plans and individual retirement accounts. In one particularly egregious example of the retirement system's inefficiencies, the Economic Growth and Tax Relief Reconciliation Act of 2001 ("EGTRRA") amended section 401(a)(31) of the Internal Revenue Code of 1986 ("the Code") to require employers to cash out benefits greater than $1,000 and up to $5,000 and to transfer these amounts to an individual retirement account/plan ("IRA) within the meaning of section 7701(a)(31) of the Code. When EGTRRA amended section 401(a)(31) of the Code, it also amended section 404(c) of ERISA to establish a "safe harbor" which generally relieves retirement plan fiduciaries of responsibility if the automatic transfer is made in a manner consistent with the final regulations enacted by the Department of Labor (DOL) as published in regulation 2550.404a-2 of Title 29 ("the Regulation"). The safe harbor provisions require plan sponsors to enter into a written agreement with an IRA provider who will receive automatic rollover distributions ("AROs"). The written agreement must limit the form of investments and must describe the investment goals and the fees charged to the IRA and allocation of those fees to the terminated plan participant or to the plan sponsor.

The EGTRRA has contributed to the rapid growth of abandoned/orphaned accounts in the retirement system, including both Safe Harbor IRAs and abandoned/orphaned 401(k) accounts. The numbers are projected to increase each year, growing from approximately 7.5 million in 1999 to approximately 42 million in 2011 and 56 million in 2015. In many instances, a consumer will have multiple 'abandoned/orphaned' retirement accounts scattered across multiple retirement plan providers, recordkeepers, or IRA providers. The result is a highly inefficient retirement savings process for the consumer, significant administrative burdens for employer-sponsored retirement plans, and an unnecessary number of small retirement accounts administered by plan providers. There are currently no automated processes in place to aid a consumer in consolidating their accounts, again, resulting in a "Hobson's Choice" between undertaking a complex and time-consuming process or simply abandoning or ignoring the retirement account.

The market for Mandatory Distributions/Safe Harbor IRAs is currently scattered and fractured; there is no dominant provider. Existing providers include: most of the larger defined contribution/401(k) providers, who are in the business primarily as an accommodation to their employer/plan sponsor clients where Mandatory Distributions may or may not be a profit center; and an array of independent but small scale providers, for which Mandatory Distributions are a profit center.

Thus, there exists a long-felt, unsolved need in the retirement industry for an automated roll-in system to provide an organized, orderly and economically-efficient movement of individuals' accounts between their former employer-sponsored retirement plans or IRAs and their new or existing employer's retirement plan(s).

A preferred Automated Roll-In System/Method ("ARIS") of the present invention comprises a "better mousetrap", employing a proprietary suite of component technologies and processes to achieve an unparalleled level of automation—and scalability—to the heretofore largely ignored, manual, expensive and time-consuming transaction of consolidation or rolling abandoned/orphaned retirement accounts or IRAs into an employee's retirement account under his/her current employer's qualified retirement plan. A preferred ARIS of the present invention will routinely, securely, and automatically source, locate and consolidate individual retirement accounts for the ultimate benefit of the consumer, while simultaneously solving the employer-sponsored plans' administrative problems.

A preferred ARIS of the present invention comprises a clearinghouse comprising a consumer individual retirement account record database; a rules & transaction engine application, and an account repository.

A preferred ARTS of the present invention will preferably be designed to achieve critical mass by targeting for membership entities that control significant volumes of Defined Contribution retirement accounts such as large plan providers. Member recordkeepers will be attracted to a preferred ARTS of the present invention because its core value propositions are appealing from both a public policy and business perspective. Such public policy benefits include: a reduction in cash outs of retirement accounts by individuals by creating a new 'path of least resistance' for transitioning employees' Mandatory Distributions. 'Do well by doing good' as American Workers' retirement account balances grow by account aggregation and "Staying Invested" so that member recordkeeper firms' business will benefit due to relief from the aggravation, risk and explicit costs of providing a perpetual stream of low margin, Safe Harbor retirement account services. Assets under management (AUM) will not be significantly reduced: Safe Harbor accounts will remain invested in member recordkeepers' products even while the expense for administration, servicing and transfer are borne, in-whole or in-part by ARIS. Over time, the largest member recordkeepers may expect their AUM to grow as an increasing number of accounts are re-cycled from former employers into existing 401(k) accounts. Member record keepers margins will improve as low margin Safe Harbor accounts are reinvested in higher margin 401(k) investment products; member record keepers that also provide Safe Harbor eligible investment products will receive new assets under investment from the mandatory distributions from member record keepers that do not provide such products. A preferred ARIS of the present invention will focus on recycling small account balances into active 401(k) accounts which will be viewed as beneficial Public Policy. It is anticipated that there will be significant interest—and support—for ARIS from the several regulatory bodies that oversee the retirement industry given a mission of ARTS will be to "Keep American Workers Invested in Retirement" as they transition from one employer plan to the next throughout their working lives—or into retirement. A preferred ARTS of the present invention will also be useful to re-unite millions of American workers with their 'orphaned' retirement savings accounts by automatically "recycling" or consolidating them into their new employer's retirement plan.

BRIEF SUMMARY OF THE INVENTION

In a first aspect, the present invention comprises a system and/or computer implemented method carried out over one or more networks for consolidating retirement accounts owned by an owner, comprising: receiving an electronic data record from a first record keeper for a first retirement account owned by the owner; searching databases and/or sending search requests to one or more account record keepers including said first record keeper for one or more other retirement accounts owned by the owner; consolidating the first retirement account into the one or more other retirement accounts upon finding the one or more other retirement accounts account.

In another aspect, the computer implemented method further comprises: creating a second retirement account owned by the owner upon not finding one or more other retirement accounts owned by the owner.

In yet an additional aspect, the computer implemented method further comprises: receiving a plurality of electronic data records from the first record keeper, wherein each electronic data record corresponds to a separate retirement account having an account owner; searching databases and/or sending search requests to one or more account record keepers including said first record keeper for one or more other retirement accounts owned by each account owner; consolidating each separate retirement account into the one or more other retirement accounts owned by a respective account owner upon finding the one or more other retirement accounts owned said respective account owner.

In another aspect of the computer implemented method, prior to sending any search requests to one or more account record keepers including said first record keeper, searching internal databases for in-house retirement account(s) owned by the owner.

In yet an additional aspect, the computer implemented method, upon finding in-house retirement account(s) owned by the owner, consolidating the first retirement account into the in-house retirement account(s) prior to sending any search requests to one or more account record keepers including said first record keeper for one or more other retirement accounts owned by the owner.

In another aspect of the computer implemented method, the databases are internal databases or may be external or third-party databases.

In yet an additional aspect, the computer implemented method further comprises: repeating the searching databases of or sending search requests to one or more account record keepers including said first record keeper for one or more other retirement accounts owned by the owner until finding the one or more other retirement accounts.

In another aspect of the computer implemented method, the repeating step is performed periodically.

In yet an additional aspect, the computer implemented method further comprises: further comprising: checking the electronic data record for completeness and/or compliance with applicable rules and/or regulations.

In yet an additional aspect, the computer implemented method further comprises: sending the electronic data record to a verification service for verification, if the data record is complete and/or in compliance with applicable rules and/or regulations.

In yet a further aspect, the computer implemented method further comprises: receiving verification results for the electronic data record from the verification service.

In yet an additional aspect, the computer implemented method further comprises: analyzing, upon verification, an account balance of the electronic data record.

In yet a further aspect, the computer implemented method further comprises: returning, upon receipt of a negative verification result, the electronic data record to the first record keeper.

In yet an additional aspect, the computer implemented method further comprises: generating a notification to the owner, wherein a content of the notification is based, at least in-part, upon the account balance.

In yet a further aspect, the computer implemented method further comprises: generating a notification to the owner, wherein a content of the notification comprises one or more of the following: a notice required by a regulation, an IRS 402(f) notification, a Safe Harbor IRA product description, and a notice describing a protocol to be followed in searching for the one or more other accounts.

In another aspect of the computer implemented method, each of the first retirement account and the one or more other retirement accounts is selected from the group consisting of a 401(k) account, an IRA, a 403(b) account, a 457 account, a 401(a) account and a profit sharing account.

In yet another aspect of the computer implemented method, each of the first and second retirement accounts is selected from the group consisting of a 401(k) account, an IRA, a 403 (b) account, a 457 account, a 401 (a) account and a profit sharing account.

In another aspect of the computer implemented method, the second retirement account comprises a Safe Harbor IRA established in accordance with the U.S. Economic Growth and Tax Relief Reconciliation Act of 2001.

In yet another aspect of the computer implemented method, one or more of the record keepers is/are member(s) of a consortium of record keepers.

In another aspect of the computer implemented method, each of the first record keeper and the one or more record keepers is selected from the group consisting of a retirement plan sponsor, an employer, a third party retirement plan administrator, a brokerage firm and an investment advisory firm.

In yet another aspect of the computer implemented method, one or more of the record keepers is/are member(s) of a consortium comprising retirement plan sponsors and/or third party retirement plan administrators.

In another aspect of the computer implemented method, the owner is a retirement plan participant.

In yet another aspect of the computer implemented method, the owner is a retirement plan participant, and the consolidating comprises a qualified rollover of the first retirement account into the one or more other retirement accounts.

In another aspect of the computer implemented method, the owner is an active participant in a retirement plan, one of the one or more other retirement accounts comprises a 401(k) account, an IRA, a 403(b) account, a 457 account, a 401(a) account or a profit sharing account under the retirement plan and the consolidating comprises a qualified rollover of the first retirement account into the one of the one or more other retirement accounts.

In yet a further aspect, the computer implemented method further comprises: creating a second retirement account owned by the owner upon not finding one or more other retirement accounts owned by the owner; and consolidating the first retirement account into the second retirement account.

In another aspect of the computer implemented method, the consolidating of the first retirement account into the second retirement account comprises a qualified rollover of the first retirement account into the second retirement account.

In yet a further aspect, the computer implemented method further comprises: repeating the searching databases and/or sending search requests to one or more account record keepers including said first record keeper for one or more other retirement accounts owned by the owner until finding said one or more other retirement accounts.

In yet another aspect, the computer implemented method further comprises: consolidating the second retirement account into the one or more other retirement accounts upon finding the one or more other retirement accounts.

In another aspect of the computer implemented method, the consolidating of the second retirement account into the one or more other retirement accounts comprises a qualified rollover of the second retirement account into the one or more other retirement accounts.

In another aspect of the computer implemented method, the second retirement account comprises a Safe Harbor IRA established in accordance with the U.S. Economic Growth and Tax Relief Reconciliation Act of 2001.

In another aspect of the computer implemented method, the owner is an active participant in a retirement plan, one of the one or more other retirement accounts comprises a 401(k) account, an IRA, a 403(b) account, a 457 account, a 401(a) account or a profit sharing account under the retirement plan and the consolidating comprises a qualified rollover of the second retirement account into the one of the one or more other retirement accounts.

In another aspect, the present invention comprises a computer implemented method carried out over one or more networks for operating a retirement account clearinghouse, comprising: receiving an electronic data record from a first clearinghouse member for a first retirement account owned by an owner; searching electronic clearinghouse databases and/or sending search requests to one or more clearinghouse members for one or more other retirement accounts owned by the owner; consolidating the first retirement account into the one or more other retirement accounts upon finding the one or more other retirement accounts.

In yet another aspect, the computer implemented method further comprises: issuing unique membership credentials to each of a plurality of clearinghouse members.

In yet another aspect, the computer implemented method further comprises: creating a second retirement account owned by the owner upon not finding one or more other retirement accounts owned by the owner.

In yet a further aspect, the computer implemented method further comprises: receiving a plurality of electronic data records from the first clearinghouse member, wherein each electronic data record corresponds to a separate retirement account having an account owner; searching databases and/or sending search requests to one or more clearinghouse members including said first clearinghouse member for one or more other retirement accounts owned by each account owner; consolidating each separate retirement account into the one or more other retirement accounts owned by a respective account owner upon finding the one or more other retirement accounts owned said respective account owner.

In another aspect of the computer implemented method, prior to sending any search requests to one or more clearinghouse members including said clearinghouse member, searching internal databases for an in-house retirement account owned by the owner.

In another aspect of the computer implemented method, upon finding an in-house retirement account owned by the owner, consolidating the first retirement account into the in-house retirement account prior to sending any search requests to one or more clearinghouse members including said first clearinghouse member for one or more other retirement accounts owned by the owner.

In another aspect of the computer implemented method, the databases are internal databases or may be external or third-party databases.

In yet a further aspect, the computer implemented method further comprises: repeating the searching databases of or sending search requests to one or more clearinghouse members including said first clearinghouse member for one or more other retirement accounts owned by the owner until finding the one or more other retirement accounts.

In another aspect of the computer implemented method, the repeating step is performed periodically.

In yet a further aspect, the computer implemented method further comprises: checking the electronic data record for completeness and/or compliance with applicable rules and/or regulations.

In yet a further aspect, the computer implemented method further comprises: sending the electronic data record to a verification service for verification, if the data record is complete and/or in compliance with applicable rules and/or regulations.

In yet a further aspect, the computer implemented method further comprises: receiving verification results for the electronic data record from the verification service.

In yet a further aspect, the computer implemented method further comprises: analyzing, upon verification, an account balance of the electronic data record.

In yet a further aspect, the computer implemented method further comprises: returning, upon receipt of a negative verification result, the electronic data record to the first clearinghouse member.

In yet a further aspect, the computer implemented method further comprises: generating a notification to the owner, wherein a content of the notification is based, at least in-part, upon the account balance.

In yet a further aspect, the computer implemented method further comprises: generating a notification to the owner, wherein a content of the notification comprises one or more of the following: a notice required by a regulation, an IRS 402(f) notification, a Safe Harbor IRA product description, and a notice describing a protocol to be followed in searching for the one or more other retirement accounts.

In another aspect of the computer implemented method, each of the first retirement account and the one or more other retirement accounts is selected from a group consisting of a 401(k) account, an IRA, a 403(b) account, a 457 account, a 401(a) account and a profit sharing account.

In another aspect of the computer implemented method, each of the first and second retirement accounts is selected from a group consisting of a 401(k) account, an IRA, a 403(b) account, a 457 account, a 401(a) account and a profit sharing account.

In another aspect of the computer implemented method, the second retirement account comprises a Safe Harbor IRA established in accordance with the U.S. Economic Growth and Tax Relief Reconciliation Act of 2001.

In a further aspect of the computer implemented method, each of the clearinghouse members is selected from the group consisting of a retirement plan sponsor, an employer, a third party retirement plan administrator, a brokerage firm and an investment advisory firm.

In another aspect of the computer implemented method, the owner is a retirement plan participant and the consolidating comprises a qualified rollover of the first retirement account into the one or more other retirement accounts.

In another aspect of the computer implemented method, the owner is an active participant in a retirement plan, one of the one or more other retirement accounts comprises a 401(k) account, an IRA, a 403(b) account, a 457 account, a 401(a) account or a profit sharing account under the retirement plan and the consolidating comprises a qualified rollover of the first retirement account into the one of the one or more other retirement accounts.

In yet a further aspect, the computer implemented method further comprises: creating a second retirement account owned by the owner upon not finding one or more other retirement accounts owned by the owner; and consolidating the first retirement account into the second retirement account.

In another aspect of the computer implemented method, the consolidating of the first retirement account into the second retirement account comprises a qualified rollover of the first retirement account into the second retirement account.

In yet a further aspect, the computer implemented method further comprises: repeating the searching databases and/or sending search requests to one or more clearinghouse members including said first clearinghouse member for one or more other retirement accounts owned by the owner until finding said one or more other retirement accounts.

In yet a further aspect, the computer implemented method further comprises: consolidating the second retirement account into the one or more other retirement accounts upon finding the one or more other retirement accounts.

In another aspect of the computer implemented method, the consolidating of the second retirement account into the one or more other retirement accounts comprises a qualified rollover of the second retirement account into the one or more other retirement accounts.

In another aspect of the computer implemented method, the second retirement account comprises a Safe Harbor IRA established in accordance with the U.S. Economic Growth and Tax Relief Reconciliation Act of 2001.

In another aspect of the computer implemented method, the second retirement account comprises a Safe Harbor IRA established in accordance with the U.S. Economic Growth and Tax Relief Reconciliation Act of 2001.

In another aspect of the computer implemented method, the owner is an active participant in a retirement plan, one of the one or more other retirement accounts comprises a 401(k) account, an IRA, a 403(b) account, a 457 account, a 401(a) account or a profit sharing account under the retirement plan and the consolidating comprises a qualified rollover of the second retirement account into the one of the one or more other retirement accounts.

In another aspect, the present invention comprises a computerized system for consolidating retirement accounts owned by an owner via network communications in a networked environment, comprising: a computerized clearinghouse comprising an electronic retirement account record database, an electronic repository of retirement accounts and an automated rules and transactions application; one or more clearinghouse members in communication with the clearinghouse via network communications; wherein a first retirement account owned by the owner may be automatically or semi-automatically consolidated, merged and/or rolled into a second retirement identified by the system via the rules and transaction engine which comprises rules, regulations, forms and/or other requirements for one or more retirement plans or retirement accounts administered or maintained by the clearinghouse and/or the one or more clearinghouse members.

In another aspect of the computer system for consolidating retirement accounts of the present invention, each of the one or more clearinghouse members is selected from the group consisting of a retirement plan sponsor, an employer, a third party retirement plan administrator, a brokerage firm and an investment advisory film.

In yet another aspect of the computer system for consolidating retirement accounts of the present invention, each of the retirement accounts comprises a 401(k) account, an IRA, a 403(b) account, a 457 account, a 401(a) account or a profit sharing account.

In another aspect of the computer system for consolidating retirement accounts of the present invention, the consolidation, merger and/or rolling into of the first retirement account into the second retirement account comprises a qualified rollover of the first retirement account into the second retirement account.

DETAILED DESCRIPTION OF THE INVENTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Figure 1:
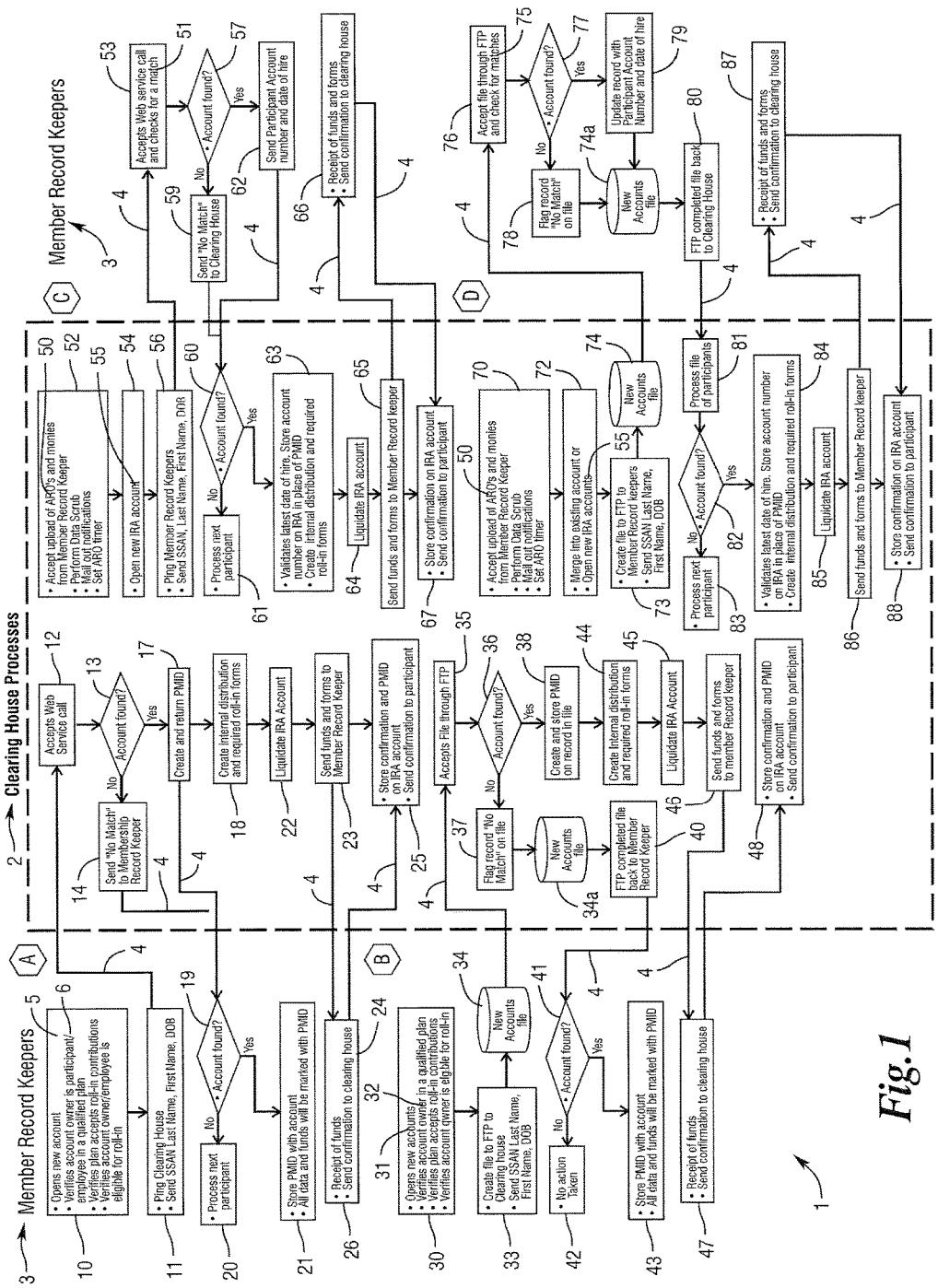
FIG. 1 is a flowchart showing an overview of various aspects of a preferred ARTS of the present invention.
Figure 2:
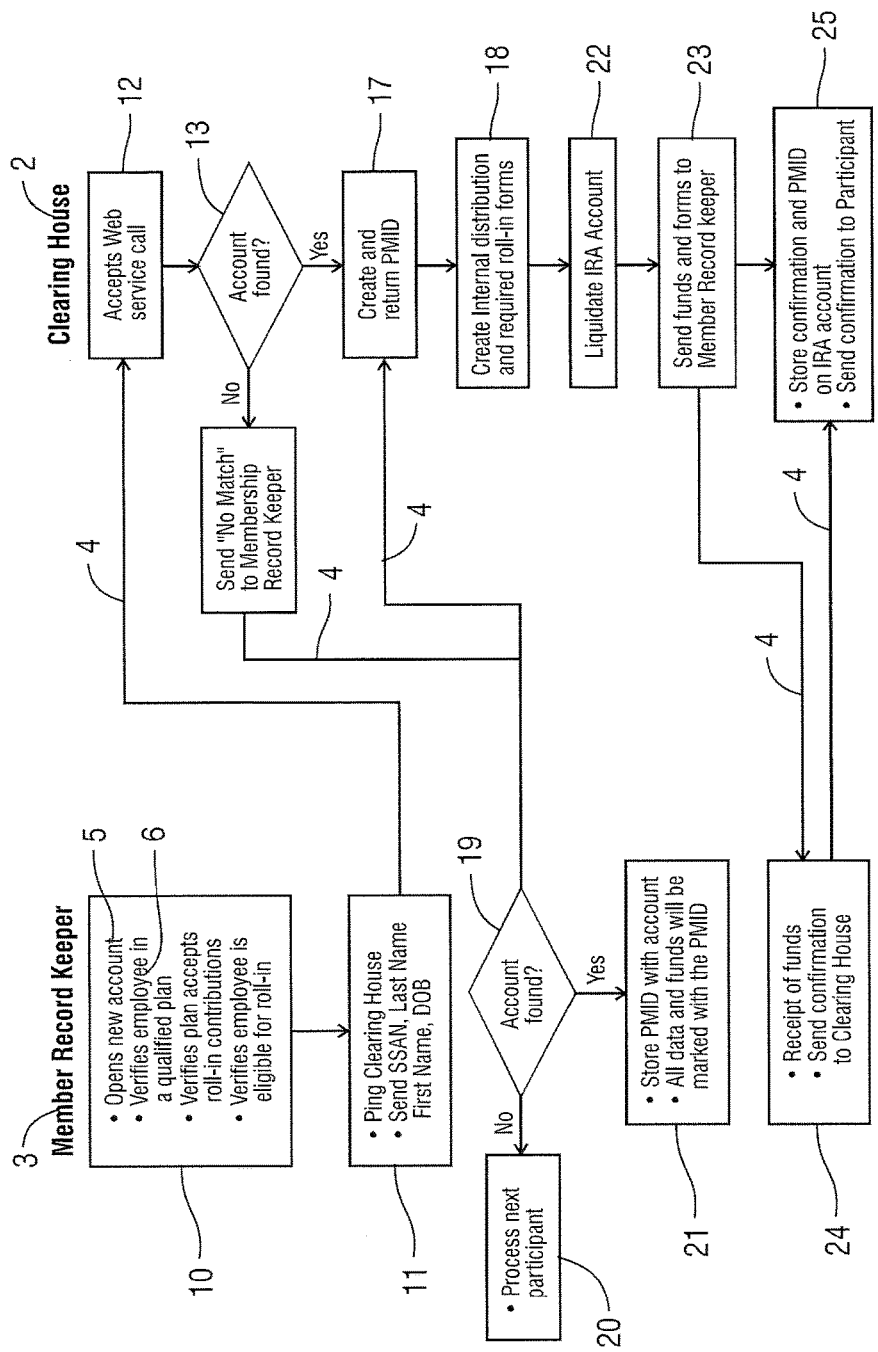
FIG. 2 is a flowchart showing a first preferred manner in which member record keepers interact with a clearinghouse of a preferred ARTS of the present invention.

FIG. 1 illustrates a preferred ARTS of the present invention designated generally by the reference numeral 1, in block diagram form.

In a preferred embodiment, ARIS and steps performed therein or thereby comprises a clearinghouse 2 for retirement accounts owned by a plurality of individuals and administered and/or maintained by a plurality of record keepers 3 such as retirement plan sponsors, employers, third party retirement plan administrators, investment advisory firms and/or brokerage firms, that may or may not be members of the clearinghouse 2. FIG. 1 provides an overview of the primary ways in which member record keepers 3 communicate or interact with clearinghouse 2, preferably via one or more network connections 4 over one or more networks, such as the Internet (not shown).

The primary and preferable interaction scenarios between member record keepers 3 and clearinghouse 2 are labeled A, B, C and D in FIG. 1; each of which is shown in more detail in FIGS. 2-5, respectively.

Regarding Scenario "A", at step 10, for example, a member record keeper 3 opens a new retirement account 5, such as a 401(k) account, an IRA, a 403(b) account, a 457 account, a 401(a) account, or a profit sharing account for an account owner 6, verifies that account owner 6 is a participant in a qualified plan, also that such plan accepts roll-in contributions and that the account owner/participant/employee 6 is eligible to have roll-ins into his/her account 5.

At step 11, member record keeper 3 "Pings" or sends an electric communication over a network correction 4 to clearinghouse 2 wherein the communication comprises: identification information for account owner 6, such as social security number, account number, last name, first name and date of birth ("DOB"). Clearinghouse 2 accepts the "ping" or web service communication call at 12; searches its internal database or inventory of accounts at 13 for one or more accounts 7, such as retirement accounts, owned by the same account owner 6. If no other accounts 7 owned by owner 6 are found, at 14 clearinghouse 2 sends a "no match" communication back to member record keeper 3 via network connection 4. If one or more other accounts 7 owned by owner 6 is/are found, at 15 clearinghouse 2 creates a "PMID" identification number 16 and sends such PMID identification number 16 to Record keeper 3 via network connection 4 at 17. Clearinghouse 2 then creates and/or prepares any required distributions, notices and/or forms at 18 necessary to effect a qualified roll-in of the one or more other found accounts 7 owned by the account owner 6 into account 5. Meanwhile, member record keeper 3 receives either the "no match" communication 14 or PMID number 16 and at 19 processes such communications by either moving on, at 20, to process an account for the next account owner/participant or by storing in a memory the PMID number 16 in association with all data and funds for account 5.

Clearinghouse 2 liquidates the one or more other accounts 7 which likely comprise IRAs at 22 and sends the liquidated funds and all required roll-in forms at 23 to member record keeper 3 via network connection 4. At 24, member record keeper 3 receives such funds and required roll-in forms and sends a confirmation of such receipt to clearinghouse 2 via network connection 4. At 25, clearinghouse 2 receives such confirmation and stores the same along with the PMID number 16 for the other account 7 and sends a confirmation notice to the account owner/plan participant 6. At 26, member record keeper 3 receives funds from the other account 7 for rolling into account 5 and sends confirmation of receipt of funds to clearinghouse 2 via network connection 4.

Figure 3:
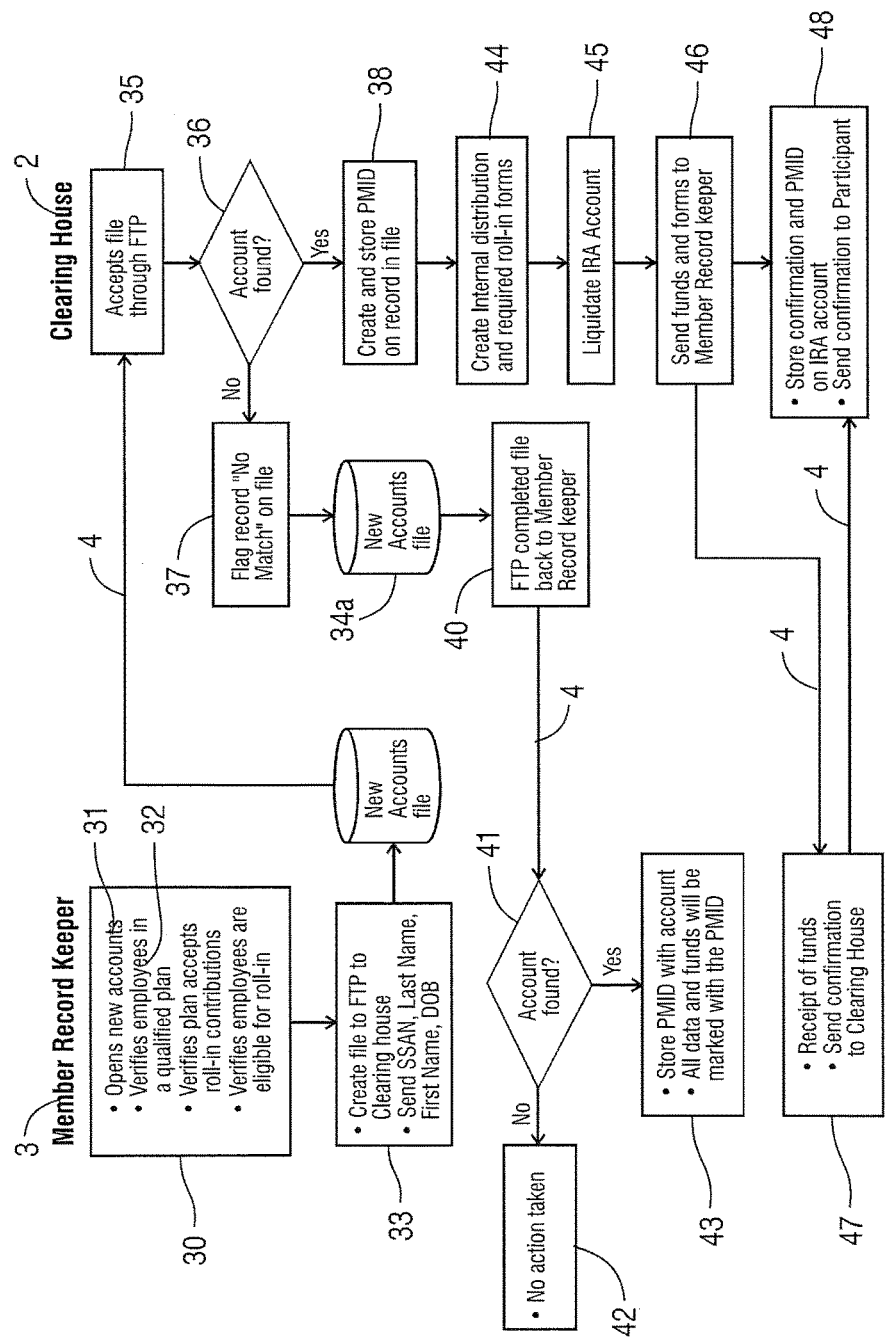
FIG. 3 is a flowchart showing a second preferred manner in which member record keepers interact with a clearinghouse of a preferred ARTS of the present invention.

As shown in FIGS. 1 and 3, in Scenario "B" member record keeper 3 processes many new plan participant accounts at once, for example, when opening a plurality of new accounts for a new client's employees participating in a qualified retirement plan administrated by member record keeper 3. Thus, at 30, member record keeper 3 opens a plurality of new accounts 31, verifies that under the plan rules that each account owner 32 is an employee in the qualified retirement plan; that such plan allows for roll-in contributions and that the account owner/employee 32 is eligible to have roll-in contributions made to his/her account 31.

Member record keeper 3, at 33, creates an FTP file 34 containing the particulars for all the new accounts 31, such as social security number, last name, first name and date of birth for each account owner 32 that owns one or more of the plurality of accounts 31 to send to clearinghouse 2 via file transfer protocol (FTP) at 35 via a network connection 4, such as over the Internet. At 36, clearinghouse 2 electronically searches its database or inventory of accounts, as well as sends search requests, either individually or in batch via FTP files as described below to other member record keepers 3 of clearinghouse 2, for other accounts 39 owned by each respective owner 32 of one of the plurality of accounts 31 in FTP file 34. For each of the plurality of accounts 31 where no matching account has been found, such accounts 31 are flagged at 37 in the FTP file with a "no match" flag while at 38 a PMID number 16 is created and stored for each other account 39 found that matches one of the plurality of accounts 31 in FTP file 34. The PMID number 16 is stored in FTP file 34a in association with its respective matching account 31 owned by same owner 32. After FTP file 34a has been completed for each of the plurality of accounts 31 by associating/storing a "no match" flag or a PMID number 16 with each account 31 therein, FTP file 34a is sent back to member record keeper 3 by file transfer protocol via network connection 4 at 40.

Member record keeper 3, at 41, determines and/or reviews whether or not a matching account 39 was found by clearinghouse 2 for each of the plurality of accounts 31. Those accounts 31 for which no other matching accounts 39 were found are parked, at 42, by member record keeper 3 and no further action is taken for the time being with respect to these unmatched accounts, except that they may be periodically included in FTP files, sent to the clearinghouse 2 as the basis of future searches for matching accounts. At 43, member record keeper 3 stores the unique PMID number 16 for each account 31 in association with that account and will mark all data and funds associated therewith, with that respective PMD number as well. Meanwhile, at 44, clearinghouse 2 creates and/or prepares any required distributions, notices and/or forms under the qualified retirement plan rules, necessary to effect a qualified roll-in of the one or more other matching accounts 39 into one of the plurality of accounts 31. Matching accounts 39 to one of the plurality of accounts 31 are those owned by the same employee/plan participant 32. Clearinghouse 2 liquidates each of the matching accounts 39 which likely comprise IRA accounts at 45 and sends the liquidated funds and all required roll-in forms, preferably in a batch process, at 46 to member record keeper 3 via network connection 4. At 47, member record keeper 3 receives such funds and required roll-in forms to roll-in the funds from each matching account 39 to its respective account 31 and sends a confirmation of such receipt to clearinghouse 2 via network connection 4. At 48, clearinghouse 2 receives that confirmation and stores the same along with the PMID numbers 16 for each account 39 and sends a confirmation notice of the roll-in to each respective account owner/employee 32.

Figure 4:
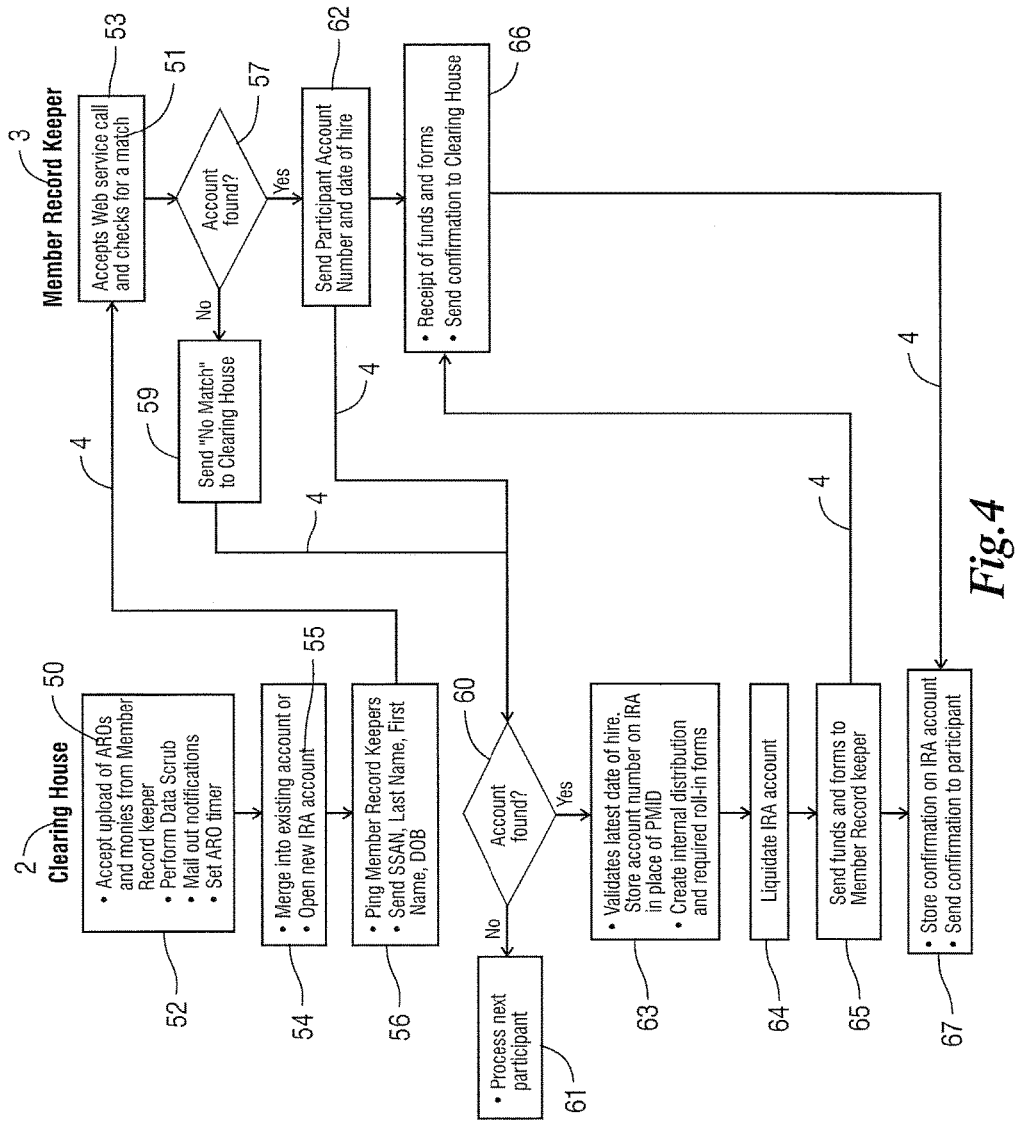
FIG. 4 is a flowchart showing a third preferred manner in which member record keepers interact with a clearinghouse of a preferred ARIS of the present invention.

Referring now to FIGS. 1 and 4, Scenario "C" exemplifies the manner in which clearinghouse 2 can assist member record keepers 3 in creating, funding and/or processing AROs and ultimately matching AROs 50 up with other matching accounts, preferably retirement accounts and most preferably a retirement plan account owned by an individual owner or retirement plan participant into which contributions from an employee's wages/salary are still being made. At 52, clearinghouse 2 accepts an account data file and funds for an ARO account 50 for account owner 6; performs a data scrub to examine the account data file for competency and rejects any such records not in compliance and returns the same to member record keeper 3; the clearinghouse 2 may also send the account data record out to a verification service to verify the information therein and the identity or account owner 6. At 54, clearinghouse 2 opens a new IRA account in name of account owner 6 then pings, at 56, all of the member record keepers 3, including the member record keeper 3 from whom clearinghouse 2 received the account data record, and sends the account owners social security number (SSAN), last name, first name and date of birth. The member record keepers 3, at 53, each accept the ping or web service call from clearinghouse 2 and each searches its internal records for a matching account 51 defined as an account owned by the same individual that owns the ARO 50 in question.

Clearinghouse 2 also mails any required notifications out to the account owner 6 and sets an automated timer to stipulate the period of time that the account owner 6 has to take action before the ARO 50 is automatically rolled into an IRA 55, such as a "Safe Harbor" account under Section 401(a)(31) of the Internal Revenue Service Code of 1986 as amended by the EGTRRA. If no matching account 51 is found by a member record keeper 3 for account 55 owned by owner 6, at 59, that member record keeper 3 sends a "no match" notice back to clearinghouse 2. At 60, clearinghouse 2 determines whether a matching account 51 has been found after receiving feedback from each of the member record keepers 3. If no matching account 51 is found, clearinghouse 2 at 61 moves on to process an ARO 50 owned by another account owner. Periodically, clearinghouse 2 will again send search requests out for matching retirement accounts owned by account owner 6 to match up with IRA account 55. If a matching account 51 is found by a member record keeper 3 at 57, the member record keeper 3 at 62 sends the participant's (owner 6's) account number and date of hire to clearinghouse 2 via network connection 4. Clearinghouse 2, at 60, determines that a matching account had been found and at 63 validates the latest date of hire and stores the participant account number in association with IRA 55 in place of any PMID number and further creates all required distribution and roll-in forms necessary to effect a qualified roll-in of IRA 55 into matching account 51.

At 64, clearinghouse 2 liquidates IRA 55 and sends, at 65, those funds and all required roll-in forms (which preferably comprise electronic forms) to member record keeper 3 via network connection 4. At 66, member record keeper 3 receives the funds to be rolled into matching account 51 and forms for the same, which preferably, is a retirement account comprising a 401(k) account or a profit sharing account under a qualified retirement plan administered by member record keeper 3 and the contribution of funds from account 55 into such retirement account 51 constitutes a qualified rollover pursuant to all applicable rules and regulations. Further at 66, member record keeper 3 sends a confirmation of the receipt of the funds and roll-in forms to clearinghouse 2 via network connection 4. Clearinghouse 2 receives the same at 67, stores the confirmation in its data record for IRA account 55 and sends a notification of the automatic rollover transaction to participant/account owner 6.

Figure 5:
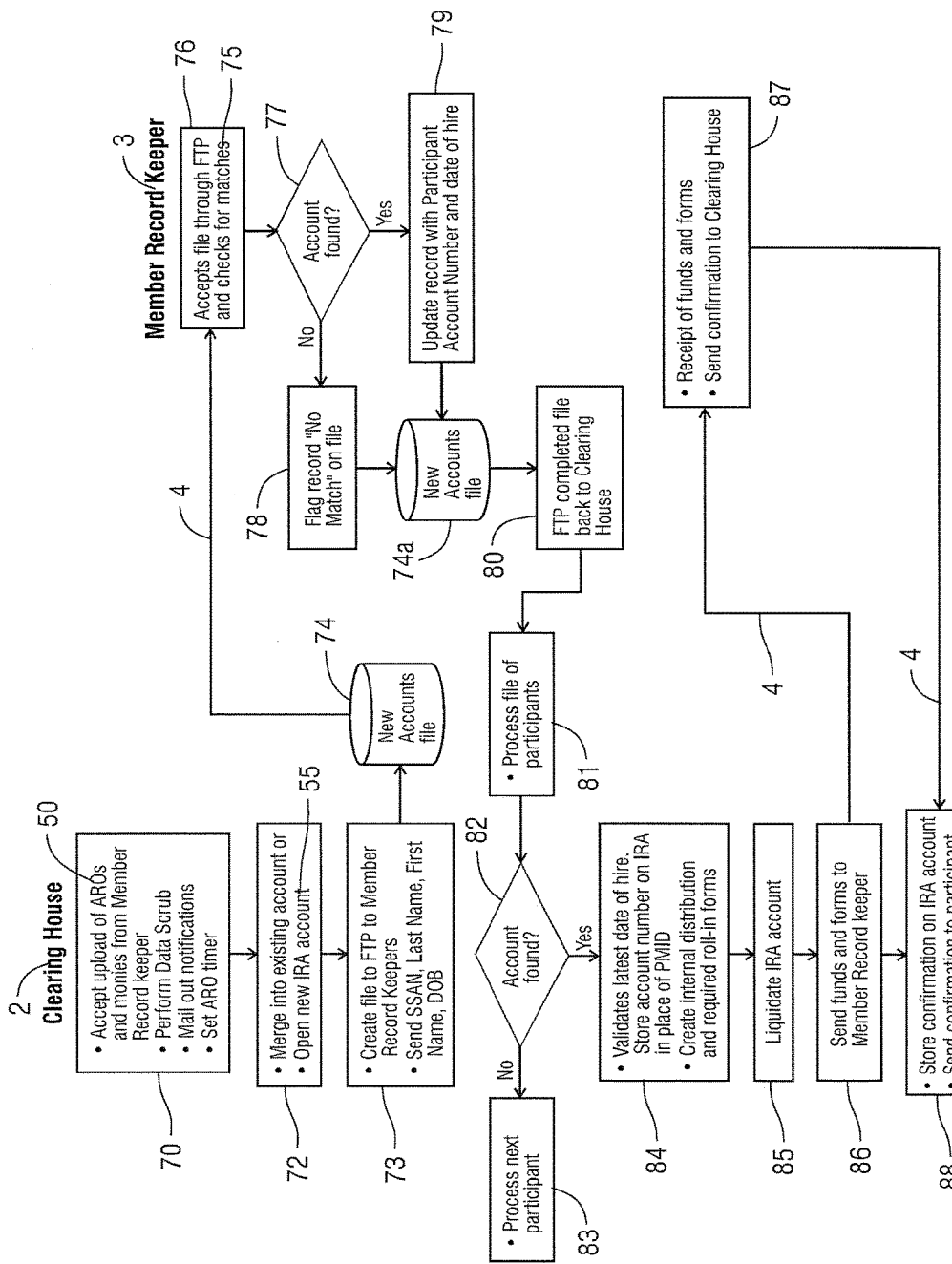
FIG. 5 is a flowchart showing a fourth preferred manner in which member record keepers interact with a clearinghouse of a preferred ARTS of the present invention.

Turning to FIGS. 1 and 5, Scenario "D" is illustrated wherein clearinghouse 2 receives at 70 a plurality of data records for a plurality of AROS 50 along with the monies/funds in aggregate to cover the individual amount for each ARO 50; clearinghouse 2 performs a data scrub and review of the data record for each ARO 50 and returns to member record keeper 3 any data records and funds that are not in compliance with all applicable rules and regulations. Clearinghouse 2 also sends all required notifications to each account owner/participant 6 who owns one of the plurality or ARO accounts 50. Clearinghouse 2 then sets the requisite timer for each of the plurality of AROS 50 to stipulate the time when each owner 6 must give instructions with respect to its account 50 before it is rolled into an account, such as an IRA account held in a repository 100 of the clearinghouse 2.

At 72, clearinghouse 2, after the requisite time period has passed without receipt of instructions from the account owner 6 for each ARO 50, either opens a new retirement account, such as an IRA 55, or consolidates the funds for each ARO 50 into a pre-existing account commonly owned by the respective owner 6 held in the repository 100 of clearinghouse 2. At 73, clearinghouse 2 creates an FTP file 74 containing the particulars including social security number, last name, first name and date of birth for each of the IRA/pre-existing accounts 55 for which matching accounts 75 will be sought from among all member record keepers 3, and sends such FTP file 74 via network connection 4 to one or more of, and preferably all of the member record keepers 3, wherein each member record keeper 3 receives FTP File 74 and searches its account databases and/or inventories at 76 for matching accounts 75. At 77, each member record keeper 3 determines whether one or more matching accounts 75 have been found for each IRA/pre-existing account 55 in FTP file 74. For each of the plurality of IRA/pre-existing accounts 55 for which no matching account is found, such accounts are flagged, at 78, with a "no match" flag while at 79 the FTP file 74 is updated by associating/storing the participant account number and date of hire of each matching account 75 found with its respective IRA/pre-existing account 55 to create FTP file 74a. After FTP file 74a has been completed at 80 for each of the plurality of IRA/pre-existing accounts 55 by associating/storing therein a "no match" flag or participant account number and date of hire information with each account 55 therein, FTP file 74a is sent back to clearinghouse 2 via network connection 4. Clearinghouse 2 processes FTP file 74a at 81 and determines at 82 whether a matching account 75 was found or not for each IRA/pre-existing account 55. At 83, those IRA/pre-existing accounts 55 for which no matching accounts 75 were found are parked and no further action is taken with respect to these accounts, except that they are maintained in the repository 100 of accounts in the clearinghouse 2 and may be again included periodically in FTP files sent out to member record keepers 3 in search of matching files therefore.

At 84, clearinghouse 2 determines that matching accounts have been found for a number of the IRA accounts 55 and with respect to each matching account from FTP file 74a, validates the date of hire information for each account owner 6 and stores the participant account number in association with its respective IRA 55 in place of any PMID number and further creates all required internal and external (as required by the particular qualified plan) documents and forms required to effect a qualified rollover of each IRA account 55 into its matching account 75. At 85, clearinghouse 2 liquidates each IRA 55 for which a matching account has been found and at 86 sends an aggregate of funds to fund all rollovers to be effected by a given member record keeper 3, as well as the required forms (preferably electronic forms) for each such qualified rollover to each respective member record keeper 3 preferably via internet connection 4.

At 87, member record keeper 3 receives the funds and forms to effect the respective qualified rollover transactions into the matching accounts 75, preferably which comprise a 401(k) account, an IRA account, a 403(b) account, 457 account, a 401(a) account or a profit sharing retirement account under a qualified retirement plan being administered by member record keeper 3 and in which the account owner/participant 6 is currently a participant in. Member record keeper 3 then sends a confirmation of its receipt of the funds and rollover forms to clearinghouse 2, via network connection 4, which stores, at 88, such confirmation information in association with its data record for each "matched" account 55 and sends a notice to each affected owner 6 whose account has been automatically rolled over into another one of his or her accounts.

Figure 6:
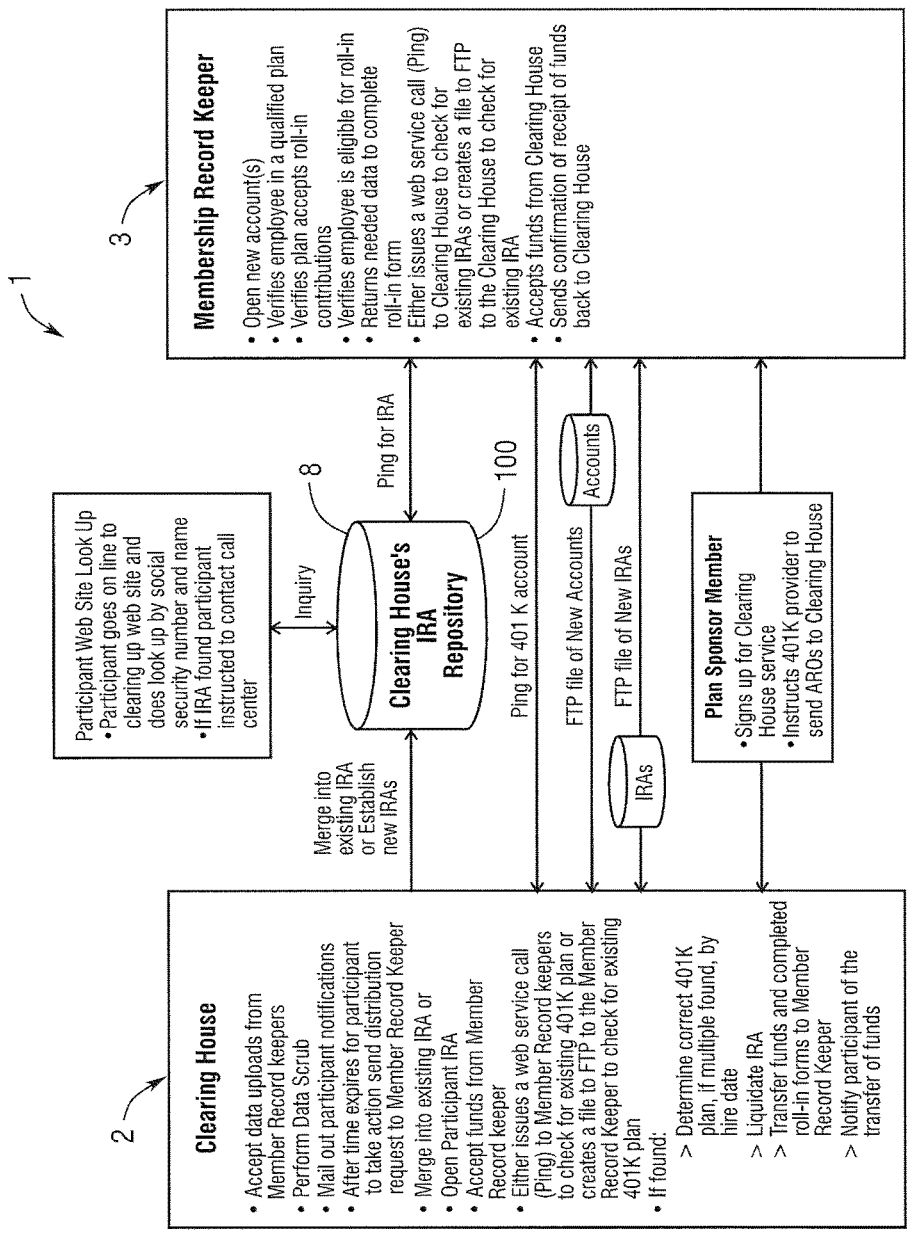
FIG. 6 is a flowchart of showing additional preferred aspects of a preferred ARTS of the present invention.

As shown in FIG. 6, preferred functions of the technology, components and processes of ARTS of the present invention driven by a preferred Rules & Transaction Engine, include:

Function 1: Receive Consumer Data Record.

Source record keeper member 3 initiates a file transfer to using TCP/IP (internet) and PGP security protocol to pass consumer data records to the ARTS 1 consumer record database (server). These transfers will happen on a regular basis from all record keeper members 3 to the ARIS 1.

Function 2: Data Scrub:

The ARIS 1 clearinghouse 2 examines the consumer data record on the server for completeness and rejects any records not in compliance with applicable rules, regulations in the rules and transaction engine. The rules & transaction engine application then batches the good records together in a new file and transmits the file to a data verification service (i.e. LexisNexis, Experian, NCOA (National Change of Address) to verify address, social security and name match, etc. Bad records are automatically returned to the source (member record keeper 3) for correction/quality control.

Function 3: Schedule & Execute Required Notification.

The verified consumer data Record will be mailed merged using a proprietary application into a consumer notification letter, as scheduled by the rules & transaction engine application of clearinghouse 2. There are a number of different types of letters based on the account balance of a consumer's retirement account and the provisions particular to each retirement plan. If the consumer falls into the Mandatory Distribution category, then the IRS notification (402f) will be included with the letter, along with a Safe Harbor IRA product description, and the notification that an electronic search will be done by the ARTS 1 rules & transaction engine application of the accounts held by other record keeper members 3 to determine whether any of the record keeper members 3 hold an active 401(k) or IRA account that the consumer retirement account is eligible to be rolled into. In the instance of a Mandatory Distribution, an automated "timer" will be initiated to stipulate the period of time that the consumer or account owner has to take action before the account is automatically rolled into a consumer retirement account, such as an IRA, held by the ARIS 1 account repository 100. The ARTS 1 rules & transaction engine application will record and store a unique "timer" as specified by each plan sponsor member's 3 retirement plan provisions.

For larger balance consumer retirement accounts, the same search will be performed, and if found, (see Function 4) the ARTS 1 rules & transaction engine application will schedule and execute a letter to be mailed to the account owner asking if they want to consolidate their inactive account into their active account. The active account could also be an existing IRA.

Function 4: Search & Locate (PING):

Initial Identification:

A 'Ping' or web service call (A Web service call which is a software system designed to support interoperable machine-to-machine interaction over a network. It has an interface described in a machine-processable format, specifically Web Services Description Language, known by the acronym WSDL. Other systems interact with the Web service in a manner prescribed by its description using SOAP messages, typically conveyed using HTTP with an XML serialization in conjunction with other Web-related standards.) will be sent as scheduled by the rules & transaction engine application to all record keeper members 3, in series, to determine whether the Consumer has an account at a record keeper members 3. Social Security Number will be used for the initial identification and record match. If a record match is found, then Function 5 will occur.

Function 5: Matching Record Found:

a. Determine Consumer Status—Record keeper members 3 will return an "Active" or "Inactive" status code for each Matching Record b. If Active:

i. ARTS system 1 performs a Secure Identification Protocol: A number of data elements are used to make certain that the correct consumer record for a retirement account has been found. These data elements are customizable for each record keeper member 3. For example: a first record keeper members 3 requires validation of: social security number, first and last name, city and state of home address. Another record keeper members 3 requires validation of: social security number, first and last name, street address, and zip code. Yet another record keeper members 3 requires validation of: social security number, first and last name, birth date. The ARTS system/application 1 passes the only those validation data elements required by each record keeper member 3, through the web service call.

ii. If the Secure Identification Protocol is confirmed, the destination record keeper member 3 will return the account number needed for the account transfer, as well as all information needed to complete the required roll-in forms.

iii. The ARTS 1 rules & transaction engine application creates the necessary data records—or completes the hard copy forms—to pass back to the source record keeper member 3 to liquidate the current account and forward the money to the ARIS lock box (electronic or physical). The ARIS 1 rules & transaction engine application will monitor activity in the ARTS lock box to determine when money has been deposited for each Consumer account. The ARTS 1 rules & transaction engine application will then complete the transaction by causing the money to be moved to the destination record keeper member 3 account, and will track, record, and reconcile the movement of the account and money from the ARIS 1 physical or electronic lock box to the destination record keeper member 3.

Function 6: Matching Consumer Record Not Found:

Mandatory Distributions: The ARTS 1 rules & transaction engine application creates an IRA in the ARTS 1 account repository 100 and schedules recurring Pings or messages to continue to search for and locate consumer retirement accounts in destination record keeper member's 3 systems and will repeat the search and locate Function 4 above until a matching consumer retirement account is found in a system or a record keeper member 3. Preferably, the ARIS 1 account repository 100 will hold all consumer retirement accounts while they remain in search & locate status, performing normal and customary qualified retirement account services for all consumer retirement accounts.

b) Voluntary Distributions: The ARIS 1 application will schedule and send out periodic communications to account owners to solicit their interest in receiving services ARIS 1.

A variety of modifications to the embodiments described will be apparent to those skilled in the art from the disclosure provided herein. Thus, the present invention may be embodied in other specific forms without departing from the spirit or essential attributes of the invention. Such modifications are contemplated as falling within the scope of the invention described herein.

The invention claimed is:

1. A computer system for identifying, locating, matching, and consolidating retirement accounts comprising:

the computer system configured to repeatedly receive from account record keepers over a computer network electronic data records associated with retirement accounts owned by owners;

a database server configured to format, standardize, and store the received electronic data records in a central database repository where all electronic data records received from account record keepers are stored;

a data packet created by the computer system using the information in the received electronic data records that is assigned to an identified retirement account owner;

the computer system creates a unique and exclusive identification term for the data packet named a PMID;

the PMID data packet is sent to account record keepers over a computer network through a file transfer protocol in search of additional information about the identified owner;

the PMID data packet is updated by the computer system when additional information about the identified owner is obtained from one or more of the account record keepers;

the computer system repeatedly resends the PMID data packet over a computer network to account record keepers through a file transfer protocol if the computer system determines that the PMID data packet does not yet contain sufficient information to conclude that the identified owner owns two or more retirement accounts;

the computer system determines when the PMID data packet no longer needs to be sent to account record keepers because it contains sufficient information to conclude that the identified owner owns two or more retirement accounts;

in the event that the computer system determines that an identified owner owns two or more retirement accounts, one or more notification correspondences having information about the status of the owner's account are generated by the computer system for transmission to the identified owner;

a timer in the computer system to track the time after which the one or more notification correspondences have been transmitted; whereby the computer system determines if the identified owner has not responded to the one or more notification correspondences within a preset time;

the PMID data packet is updated with information regarding whether the identified owner did not respond to the one or more notification correspondences within a preset time, and/or authorized an account consolidation, and/or requested no account consolidation;

when the computer system determines that the identified owner did not respond to the one or more the notification correspondences within a preset time or authorized an account consolidation, the computer system generates distribution instructions necessary to consolidate money in the two or more retirement accounts owned by the identified owner;

the computer system consolidates the money in the two or more retirement accounts owned by the identified owner into one of the accounts and eliminates the one or more accounts from which the money was removed;

the computer system eliminates the need for fees associated with the one or more eliminated accounts from which the money was removed; and after the computer system completes the consolidation, it updates the PMID data packet with information pertaining to the consolidation and stores the PMID data packet.

2. The computer system of claim 1, wherein the computer system automatically creates a consistent file and data format from multiple data sources to standardize the electronic data records in the database server.

3. The computer system of claim 1, wherein the computer system automatically analyzes whether the database has any prior records for the one or more owners.

4. The computer system of claim 1, wherein the computer system automatically analyzes the database server to determine whether the one or more owners has consented to have the retirement account associated with one or more refined electronic data records and any of the newly identified retirement accounts consolidated.

* * * * *